United States Patent [19]
Blum, Jr.

[11] Patent Number: 4,791,848

[45] Date of Patent: Dec. 20, 1988

[54] SYSTEM FOR FACILITATING INSTRUCTION OF MUSICIANS

[76] Inventor: Kenneth L. Blum, Jr., 2310 Brightleaf Way, Baltimore, Md. 21209

[21] Appl. No.: 133,655

[22] Filed: Dec. 16, 1987

[51] Int. Cl.[4] .......................... G10G 1/02; G10G 3/04; G09B 15/00; G10H 3/12

[52] U.S. Cl. ........................................ 84/453; 84/462; 84/485 R; 84/1.16; 84/DIG. 30

[58] Field of Search ............. 84/461, 462, 463, 470 R, 84/477 R, 478, 479 R, 479 A, 485 R, 267, 293, 314, 315, DIG. 30, 1.03, 1.16, 453

[56] References Cited

U.S. PATENT DOCUMENTS

| | | | |
|---|---|---|---|
| 3,837,256 | 9/1974 | Gullickson | 84/485 R X |
| 3,895,555 | 7/1975 | Peterson et al. | 84/477 R X |
| 3,978,757 | 9/1976 | Johnson, Jr. et al. | 84/485 R |
| 4,286,495 | 9/1981 | Roof | 84/485 R |
| 4,479,416 | 10/1984 | Clague | 84/462 |
| 4,510,840 | 4/1985 | Inami et al. | 84/477 R |
| 4,545,281 | 10/1985 | Habiht | 84/478 X |
| 4,546,690 | 10/1985 | Tanaka et al. | 84/477 R |

Primary Examiner—W. B. Perkey
Attorney, Agent, or Firm—Leonard Bloom

[57] ABSTRACT

A system for facilitating instruction of musicians in playing of a stringed musical instrument of the type having a plurality of strings and a plurality of frets such as a guitar. The system includes means for producing signals representing musical notes to be played, this means including an array of switches (which may take the form of capacitors), one switch being provided for each note. The switches are positioned beneath each string, which may constitute one of the components of respective switches within a group, in vicinity of each fret. Processing means, which may be coupled to the means for producing signals, produces data representing the musical notes when the system is in its input configuration. Means for receiving, storing and playing back data therefrom representing the musical notes are coupled to the processing means. The processing means may be coupled to the means for receiving, storing and playing back data and are responsive to data develops signals representing the musical notes when the system is in its playback configuration. Display means, which may be coupled to the processing means and responsive to the signals therefrom, provides visual indication of the musical notes to be played, the display means including an array of light-emitting members (which may be LED's), one light-emitting member (LED) being provided for each note. Individual ones of the light-emitting members are positioned beneath each string in vicinity of each fret.

9 Claims, 11 Drawing Sheets

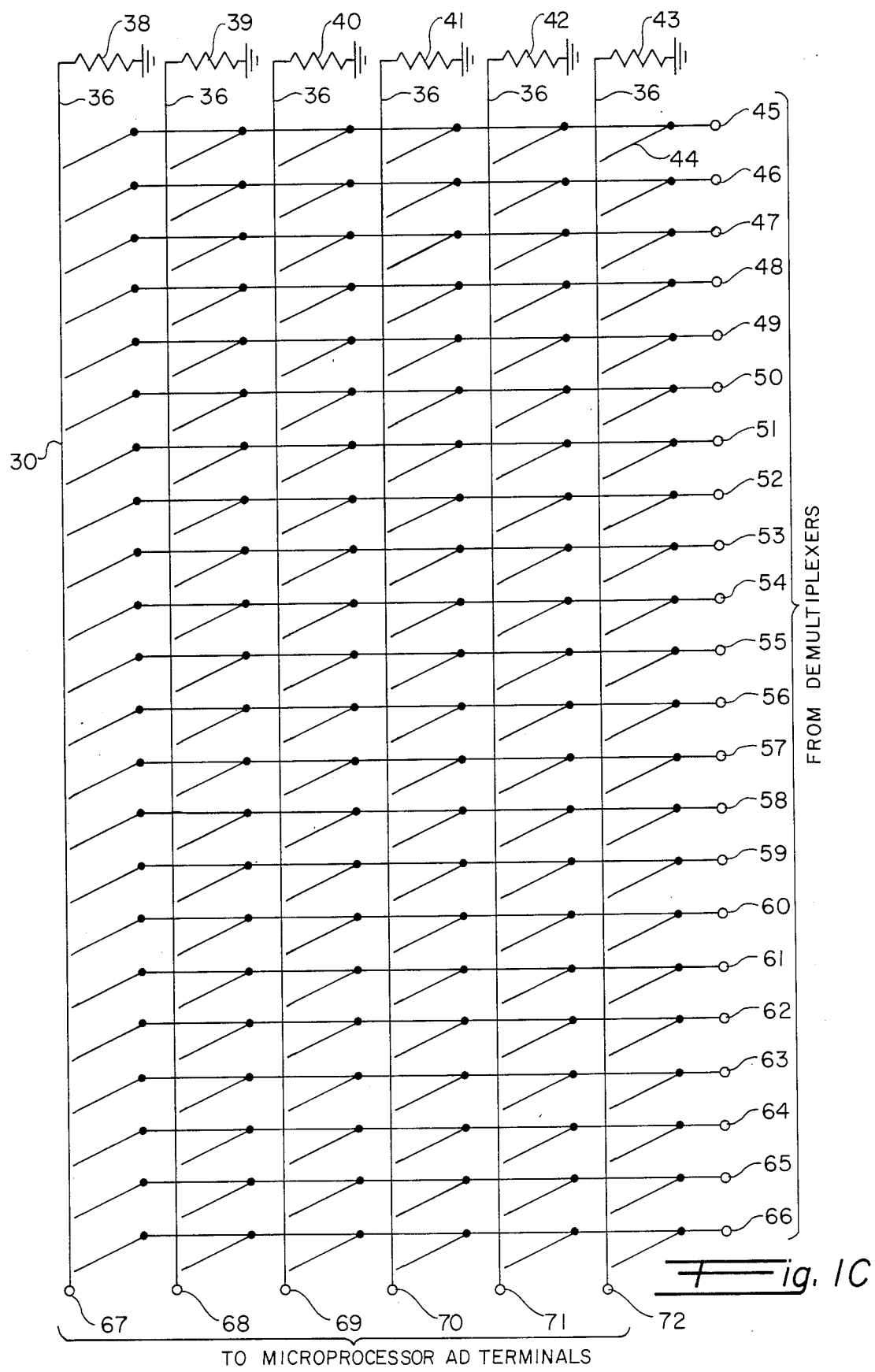

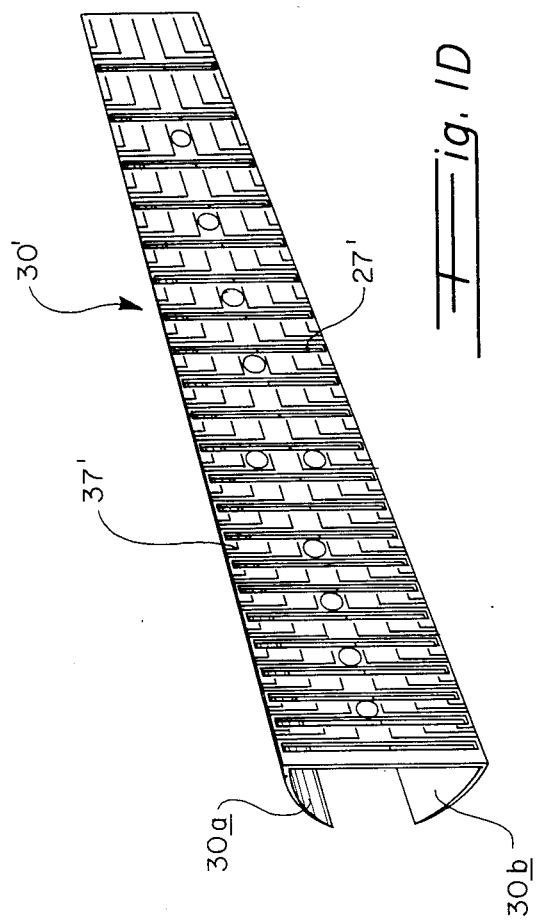

SYSTEM FOR FACILITATING INSTRUCTION OF MUSICIANS

BACKGROUND OF THE INVENTION

This invention relates to an electronic system for facilitating instruction of persons in the playing of musical instruments. More particularly, the present invention relates to a system useful in teaching students to play stringed instruments, such as a guitar, and in their learning to play individual musical compositions on such instruments.

Various attempts have been made to aid persons in learning to play a musical instrument and/or in learning to play a new composition on an instrument with which the individual is already familiar. In general, a student must become familiar with the instrument and the music to be played, including the various notes and time values thereof and, thereafter, tediously practice to become reasonably proficient on the instrument and/or in successfully performing a new composition on the instrument. Various devices have been developed, such as attachments to guitars and the like, to aid a student in learning to play such instruments and compositions thereon.

A prior art system for use with guitars and similar stringed instruments, is disclosed in U.S. Pat. No. 4,080,867 granted Mar. 28, 1978 to Srinkarn Rotanangsu and entitled "Electronic Display System for Musical Instruments." In this known system, a display in the form of a biaxial arrangement light-emitting-diodes (LED's) indicates which string or strings are to be played along one axis and which fret is to be fingered along the other axis, as well as the time value or values of the note or notes. The student, when using this known system must constantly visually observe respective single rows of LED's along the two spaced apart axes, an x axis and a y axis, in order to receive the visual instructions allowing him properly to play the instrument and/or a particular musical composition. At best, this is difficult because of the need for observing the LED's along both the x and the y axes in order to receive the correct visual instructions, cues or stimuli for each note, of many to be played. Considerable eye movement may be required, a distinct shortcoming in the learning process and a distraction.

On the other hand, were a student using the know system to position the instrument, relative to his or her eyes, so that little or no eye or head movement would be required, simultaneously to observe all the LED's along both the x and the y axes, it is most likely that the instrument would not be correctly oriented and/or positioned. Thus, at the same time a student is learning to play the instrument or a composition, in accordance with the know system, he or se is being conditioned to hold the instrument in less than the most desirable position and orientation and/or to make eye and head movements inappropriate for an accomplished musician. Indeed, the student may, as a result of using the known system, develop inappropriate and undesirable habits and/or techniques, which limit development of his or her skills and potential as a musician.

The prior art system of Rotanangsu, supra, includes a keyboard for entering note value and note timing and a memory for storing data bits indicative of the notes and the timing thereof. The known system further includes time multiplexing for encoding the time values of the notes. The data is then recorded serially on a standard single tract cassette recorder. For playback, the serial data from the single tract cassette is converted into parallel data and fed to the instrument for display, the displaying being effected by light-emitting diodes positioned along two axes, which indicate the note and time values.

Inasmuch as the notes and time values thereof are entered via a nonmusical keyboard, in the known system, subtle exemplary artistic variations are not possible, as would be the case were a lesson being given by a musician who is present. Moreover, verbal instructions from a teacher and/or a demonstrational playing of the instrument by a teacher is not possible.

SUMMARY OF THE INVENTION

A principal object of the present invention is to provide a system for facilitating the instructing of students of music, which allows one to learn to play a stringed instrument or composition thereon while observing signal lamps indicative of individual notes to be played and durations thereof with minimal eye movement.

Another object of the invention is to provide a system for facilitating the instructing of students of music which allows one to learn to play a stringed instrument or composition thereon while holding the instrument in its proper position and orientative and, at the same time, observing signal lamps indicative of individual notes to be played and durations thereof.

An additional object of the invention is to provide a system for facilitating the instructing of students of music which makes it possible to base the instruction on input from an accomplished artist or teacher, as he or she plays the stringed instruments or composition to be learned thereon.

A further object of the invention is to provide a system for facilitating the instructing of music students in which audible verbal comments of an artist or teacher and an audible playing of the stringed instrument or composition from a recording may be used, in addition to signaling a student as to the fingering required, using signal lamps.

Yet another object of the present invention is to provide a system for facilitating the instructing of students of music which allows the student properly to hold and to orient an instrument, while avoiding undesirable eye and/or head movement and yet receive visual indications as to the fingering and the durations values of the notes to be played.

Yet an additional object of the present invention is to provide an instructional stringed instrument which may be used as a component of the above-noted system of the present invention by a student when the system is being used in its playback mode.

Yet a further object of the present invention is to provide a stringed instrument which may be used as a component of the above-noted system, the instrument being used by an artist or teacher when the system is in its input mode.

From an overall system viewpoint, the present invention can be seen as a system for facilitating instruction of musicians in playing of a stringed musical instrument of the type having a plurality of strings and a plurality of frets such a a guitar. The system includes means for producing signals representing fret and string information of musical notes being played, this means including an array of switch means (which may take the form of capacitors), one switch means being provided for each note, the switch means being positioned beneath each string in vicinity of each fret. Processing means, which may be coupled to the means for producing signals, produces data representing the fret and string information. Means for receiving, storing and playing back data therefrom representing the musical notes are coupled to the processing means. The processing means may be coupled to the means for receiving, storing and playing back data and respond to the data developing signals representing the fret and string data. Display means, which may be coupled to the processing means and responsive to the signals therefrom, provides visual indication of the musical notes to be played, the display means including an array of light-emitting members (which may be LED's), one light-emitting member being provided for each note. Individual ones of the light-emitting members are positioned beneath each string in vicinity of each fret or in the vicinity of each of the intersections between a visual representation of each fret and each string on a mirror image representation of the string instrument (or the neck thereof).

From one point of view the invention can be seen as being in a system for facilitating instruction of musicians in the playing of a stringed musical instrument of the type having a plurality of strings and a pluarlity of frets such as a guitar, the system having means for receiving and storing data representing fret and string information of musical notes to be played. Processing means operatively coupled to the means for receiving and storing data respond to output therefrom and develop signals representing the musical notes. Display means coupled to the processing means respond to the signals therefrom, providing visual indication of the musical notes to be played. In accordance with a salient feature of the invention the dispaly means comprises an array of light-emitting members, one light-emitting member being provided for each note.

From another point of view the invention can be seen as being in a system for facilitating instruction of musicians in the playing of a stringed musical instrument of the type having a plurality of strings and a plurality of frets such as a guitar, the system including means for producing signals representing fret and string information of musical notes being played. Processing means operatively coupled to the means for producing signsl produce data representing the fret and string information. Means coupled to the processing means receive and store the data therefrom representing the fret and string data. In accordance with salient features of the present invention, the means for producing signals representing the fret and string information of the musical notes being played comprises an array of switch means, one switch means being provided for each note and wherein the individual switch means are positionable beneath each string in vicinity of each fret or in the vicinity of each of the intersections between a visual representation of each fret and each string on a mirror image representation of the string instrument (or the neck thereof).

From another vantage point, the invention can be seen as being in a system for facilitating instruction of musicians in the playing of a musical instrument, the system having means for receiving and storing data representing musical notes to be played. Processing means operatively coupled to the means for receiving and storing data respond to data therefrom and develop signals representing the musical notes. In accordance with the present invention, the means for receiving and storing data includes a recording medium, the data being recorded on and retrievable from the medium, the system including means for reproducing audio voice and/or musical signals from the medium, in addition to the data. The recording medium may be a multitrack medium, the data being recorded on and being reproducible from one track of the medium. The audio voice and/or music signals are recorded on and are reproducible from another track of the medium.

From a somewhat different vantage point, the invention can be viewed as being in a system for facilitating instruction of musicians in the playing of a musical instrument, the system including means for producing signals representing musical notes being played. Processing means operatively coupled to the means for producing signals produce data representing the musical notes. Means coupled to the processing means receive and store data therefrom representing the musical notes. In accordance with the present invention, the means for receiving and storing data include a recording medium. The data is recorded on tracks in the medium. The system includes means for recording voice and/or music on the medium, in addition to the data. The recording medium may be a multitrack medium, the data being recorded on and being reproducible from one track of the medium. The audio voice and/or music signals are recorded on and are reproducible from another track of the medium.

In one subcombination aspect, the invention can be viewed as an instructional stringed instrument of the type having a plurality of strings and a plurality of frets, for use by a student. The instrument includes a body and a neck, the frets being distributed along the neck and the strings extending along the neck. An array of spaced-apart, light-emittng members are positioned on the neck of the instrument (or on a visual representation of the neck of the instrument), individual ones of the light-emitting members being positioned beneath each of the strings in vicinity of each of the frets or in the vicinity of each of the intersections between a visual representation of each fret and each string on a mirror image representation of the string instrument (or the neck thereof).

Each of the light-emitting members may be constituted by a respective light-emitting diode.

In another subcombination aspect, the invention can be seen as an input stringed instrument of the type having a plurality of strings and a plurality of frets, for use by an instructor. The instrument includes a body and a neck, the frets being distributed along the neck and the strings extending along the length. An array of spaced-apart switch means or the like (which may be capacitors) are positioned on the neck of the instrument, individual ones of the switch means being positioned beneath each of said strings in vicinity of each of the frets.

The invention can also be seen as an input device for use in conjunction with an input stringed instrument of the type having a plurality of strings and a plurality of frets. The device includes an array of switch means or the like (which may be capacitors) and a sheet, the array of switch means being carried in or on the sheet. The sheet has a plurality of apertures therein through which the frets may extend, the switch means being so distributed that individual ones of said switch means will be positioned beneath each of the strings in vicinity of each of the frets whenever the sheet is positioned on the instrument.

The invention can also be seen as an output device for use in conjunction with an instructional stringed instrument of the type having a plurality of strings and a plurality of frets. The output device comprises an array of light-emitting members, the array of light-emitting members being so distributed that individual ones of the light-emitting members represent respectively position of each of the strings in vicinity of each of the frets.

The invention can be seen as being in a system for facilitating instruction of musicians in playing of a stringed musical instrument of the type having a plurality of pickup heads, strings and frets, such as a guitar. The system includes a recorder. In accordance with an embodiment of the invention, a plurality of frequency counters are provided. Individual ones of the frequency counters are coupled to respective ones of the pickup heads and respond to signals therefrom resulting from playing of the instrument to develop signals, corresponding to musical notes being played on each string, respectively. Multipliers coupled to respectively ones of the counters respond to output therefrom and develop respective signals in separated bands whereby respective ones of the strings can be identified. Interface means coupled to the multpliers respond to output therefrom supply input to the recorder. The interface means are, in a detailed embodiment, digital-to-analogue converters.

The invention can also be seen as being in a system for facilitating instruction of musicians in playing of a musical instrument, the system having a recorder for receiving and storing signals representing musical notes to be played and time values thereof. Processing means respond to output from the recorder for developing signals representing the musical notes. Display means are coupled to the processing means and respond to signals therefrom for providing a visual indication of the musical notes to be played. In accordance with an embodiment of the invention, an analogue-to-digital converter coupled to said recorder responds to output therefrom and converts signals therefrom to digital signals representing the musical notes to be played and the time values thereof. A universal asynchronous receiver/transmitter coupled to said analogue-to-digital converter responds to output therefrom. Microprocessing means coupled to the universal asynchronous receiver/transmitter and responsive to output therefrom develops signals for controlling scanning of the display means. Demultiplexer means responsive to the signals from the microprocessing means effects scanning of the display means and, with the microprocessing means, effects selective energization of components of the display means.

The invention can also be viewed as being in a system for facilitating instruction of musicians in the playing of a musical instrument, the system having a recorder for storing details representing musical notes to be played and time values thereof. Display means provide a visual indication of the musical notes to be played. In accordance with the invention, a Fourier transform circuit coupled to said recorder and responsive output therefrom develops signals representative of the musical notes to be played. A plurality of dividers coupled to the Fourier transform circuit responds to output therefrom for separating the output into respective bands. A plurality of frequency counters individually coupled to respective ones of the dividers respond to output therefrom and develop fret and string identifying signals. Demultiplexing means are coupled to the frequency counters respond to the signals therefrom and control energization of the display means for providing a visual indication of the musical note to be played. The display means may comprise an array of light-emitting members, which may be LED's.

BRIEF DESCRIPTION OF THE DRAWING

FIG. 1C is a schematic diagram of the switch array which is carried on the removable board shown in FIG. 1B, the switch connections to circuit ground being shown as well.

FIG. 1D is a pictorial illustration of a flat removable board which, when the system is being used in its input configuration, may be positioned beneath the strings of a conventional guitar and constitute an input device.

DETAILED DESCRIPTION OF THE PREFERRED EMBODIMENTS

The present invention in its broad systems aspect involves both an input configuration and an output configuration and, in subcombination form, input circuitry and output circuitry, including respective input (recording) and output (playback) circuit arrangements and components.

Figures 1A, 1B:
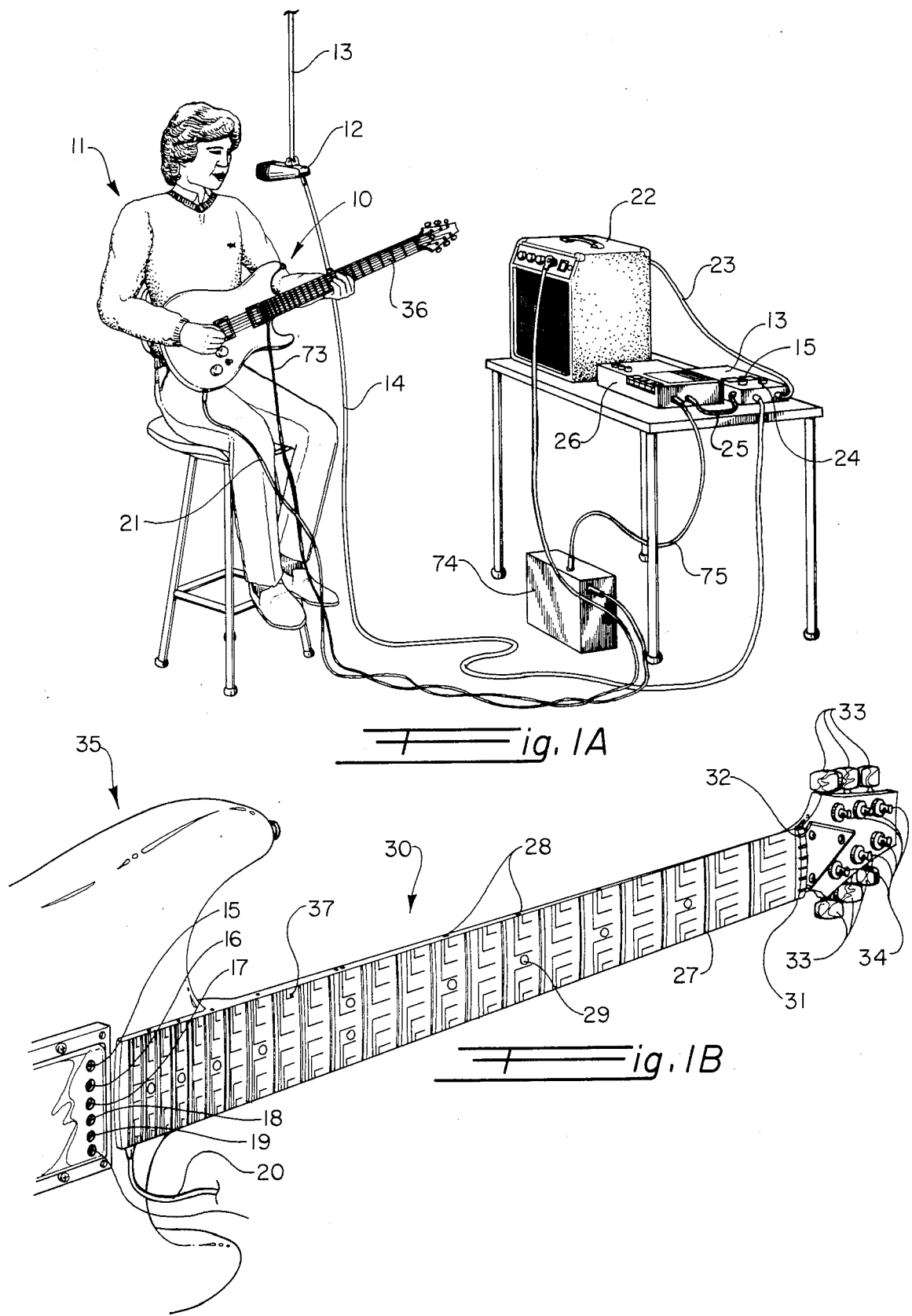
FIG. 1A is a simplified, pictorial view of an exemplary embodiment of a system for facilitating instruction of musicians, arranged in its input configuration, in accordance with the present invention, an instructor being shown holding a guitar during a recording session.
FIG. 1B is an enlarged pictorial view of the neck portion of the guitar shown in FIG. 1A, the strings having been removed for the sake of clarity, to expose for viewing details of components beneath the strings.
Figure 2:
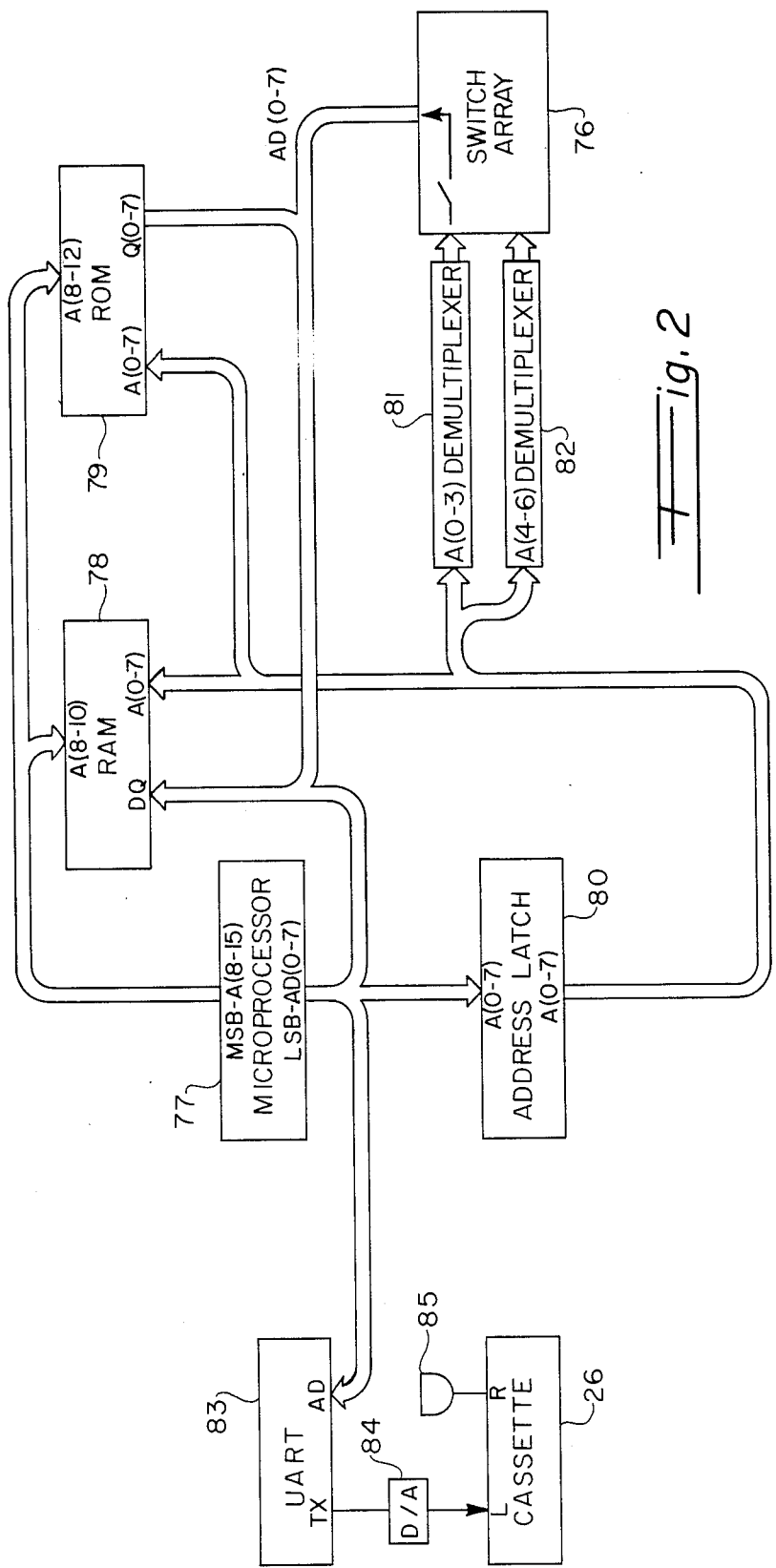
FIG. 2 is a simplfied block diagram of the exemplary embodiment of the system for facilitating instruction of musicians, the system being illustrated in the input configuration.
Figure 3A:
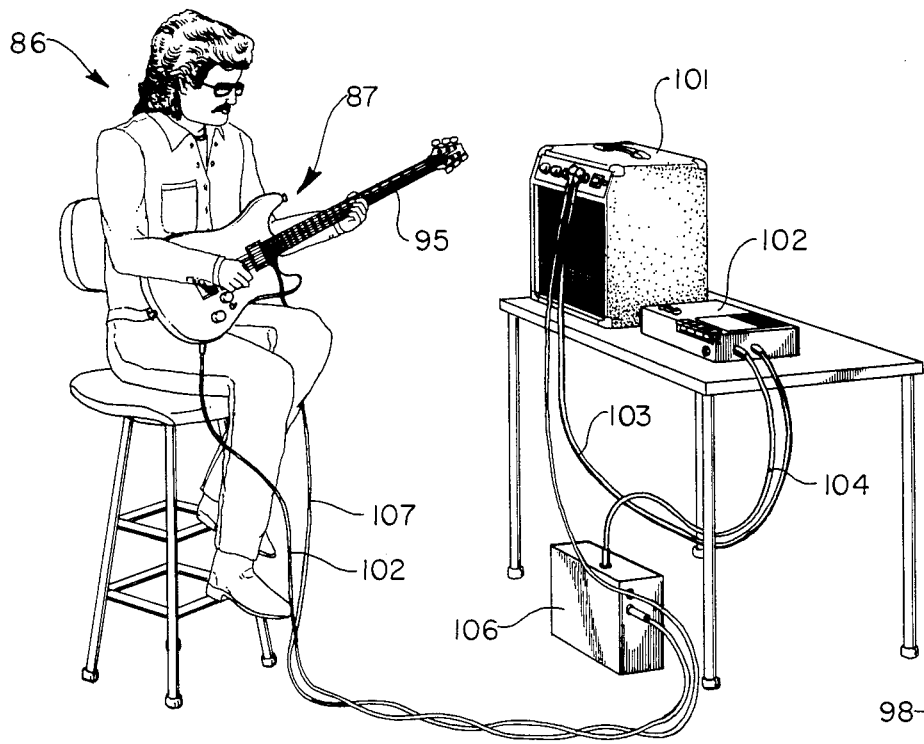
FIG. 3A is a simplfied pictorial view of an exemplary embodiment of a system for facilitating instruction of musicians, arranged in its playback configuration, a student being shown holding an instructional guitar during a learning session.
Figure 3B:
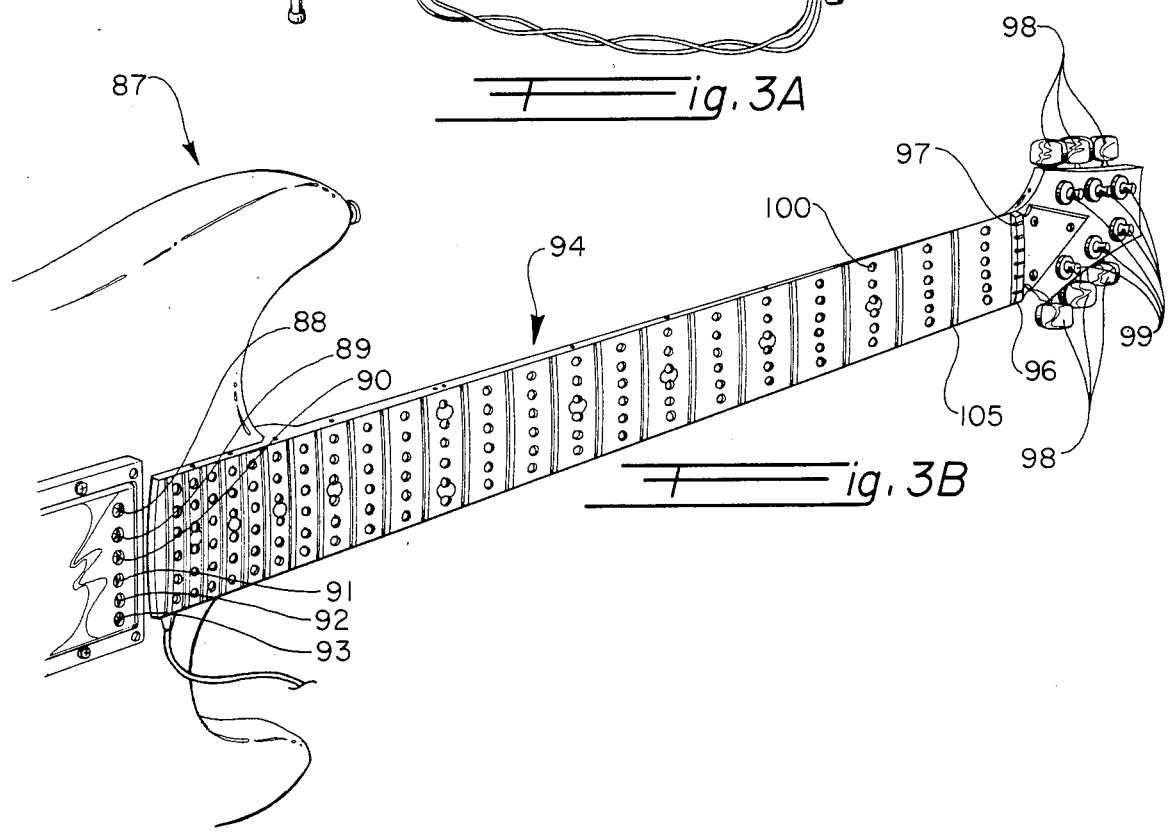
FIG. 3B is an enlarged pictorial view of the neck portion of the instructional guitar shown in FIG. 3A to show details and placement of display LED's.
Figure 4:
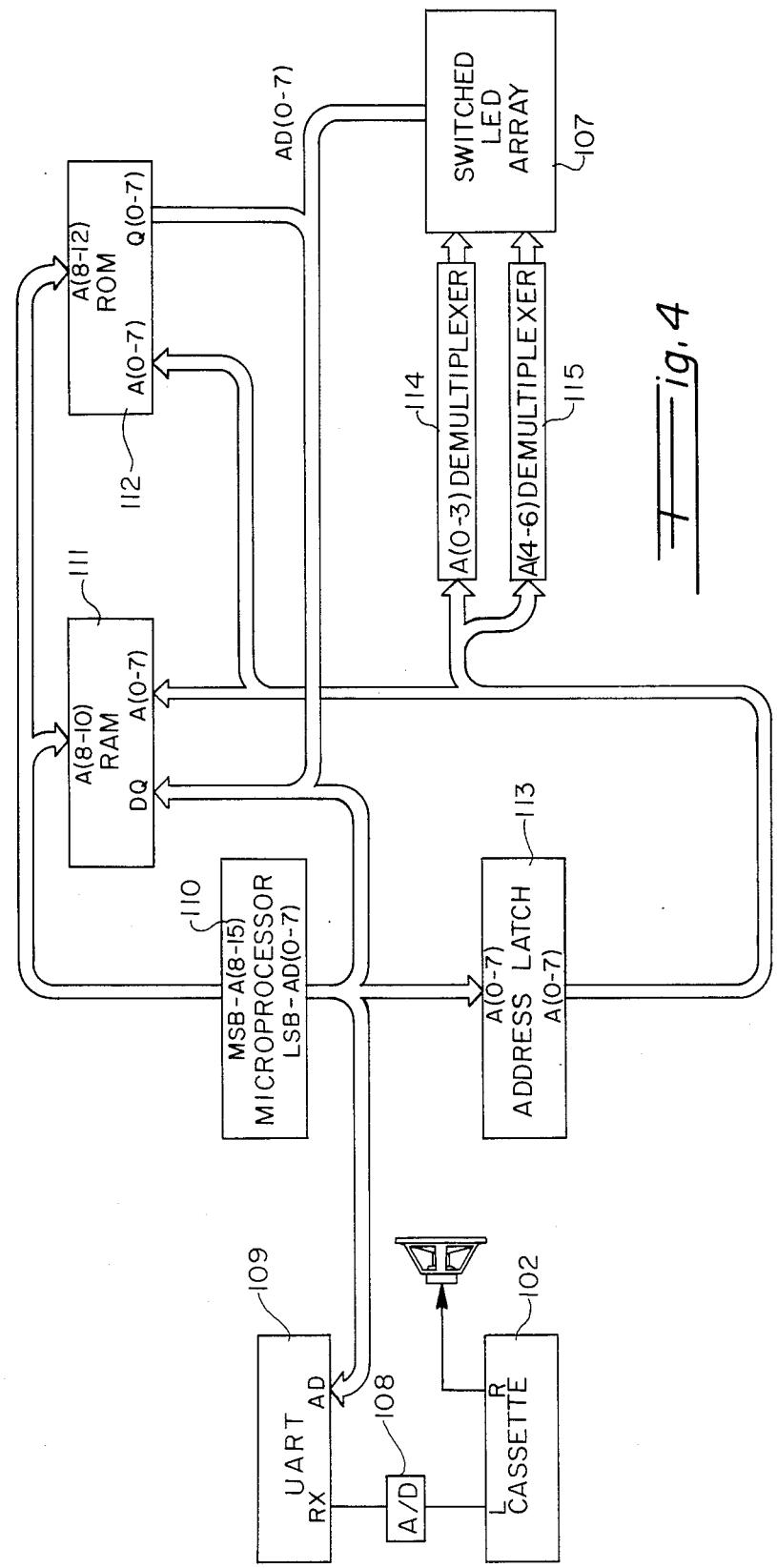
FIG. 4 is a simplified block diagram of the exemplary embodiment of the system for facilitating instructions of musicians, the system being illustrated in its playback configuration.

In FIGS. 1A, 1B, taken with FIG. 2, a particularly suitable preferred input circuit configuration is illustrated; in FIGS. 3A, 3B, taken with FIG. 4, a particularly suitable preferred output circuit configuration is illustrated. As is readily seen, the input and output circuit configurations are such that similar circuit components are present in both configurations; thus, the configurations lend themselves to compatibility and reproducibility.

Turning to FIGS. 1A and 1B, which are pictorial views relating to a first embodiment of the present invention, illustrated in its input configuration, the system includes an input guitar 10. As shown in FIG. 1A, the guitar 10 is illustrated as being held by an instructor 11. A microphone 12 is shown suspended from a ceiling (not shown) by a support 13 so as to be positioned to near the mouth of the instructor 11 so that the instructor may, speak into the microphone 12 and provide an audio input to a conventional linear mixer 13, via a cable 14. The linear mixer 13 is provided with a level-setting control knob 15 for setting the audio level of signals from the microphone 12.

The guitar 10 which includes a set of six conventional pickup heads, which include six conventional pole pieces 15-20 (FIG. 1B). The audio output signals from the electronic guitar 10 passed, as is conventional, to a cable 21 which extends to an input connection of a loudspeaker assembly 22, allowing the instructor 11 to hear the music which he plays on the instructional guitar 10.

The speaker assembly 22 includes an audio takeoff for the purpose of feeding the musical signals produced by the guitar 10 to a second input of the linear mixer 13, via a cable 23. A further level-setting knob 24 is provided on the linear mixer 13 so as to set the level of the audio input corresponding to the musical notes produced by the instructor 11 playing the guitar 10. A cable 25 extends from the linear mixer 13 to the right input channel of a cassette recorder 26 to supply audio input thereto consisting of a mix of voice input from the microphone 12 and a musical input from the guitar 10. Thus, the instructor 11 is able to record his voice signals and audio signals corresponding to the output of his instructional guitar 10 on one track of a recording medium moving within the cassette recorder 26. This channel could be conveniently the "right" channel of the cassette recorder 26. It is to be understood that other types of recording/playback devices, for example, compact disk (CD) recorders could be used in place of the cassette.

Turning briefly to FIG. 1B some details of the structure of the special input guitar 10 are shown. The guitar 10 includes, as visible in FIG. 1B six pickups which are associated with the six pickup pole pieces 15-20. The guitar 10 also includes, as is conventional, 22 frets 27, only the uppermost fret being designated by this reference numeral. A plurality of conventional position markers 28 and 29 are provided respectively among the visable side edge of the neck 30 and the upper surface of the neck, only one of the markers on the visible edge and the upper surface of the neck being provided with these reference numerals. The guitar 10 includes a conventional nut 31 having conventional guide grooves 32 therein, only one of the guide grooves being provided with this reference numeral. The guitar 10 includes six conventional tuning keys 33 with six individually associated conventional posts 34. The guitar 10 includes conventional strings which extend from the tuning keys 33 and the posts 34, via the nut 31 along the neck 30 of the guitar above the frets 27 and thereon across the upper surface of the body 35 of the guitar 10 in such a fashion that a respective one of the pickup pole pieces 15-20 is positioned beneath each of the strings. For the purpose of clarity, the strings 36 have been removed from the neck of the guitar 10 as illustrated in FIG. 1B, the strings 36 being shown in FIG. 1A. In accordance with the present invention a plurality of spaced, distributed electrically conductive metallic members 37 are positioned in or on the upper surface of the neck 30 of the guitar 10 which insulates the metallic members 37 from each other. As shown in FIG. 1B, individual groups of six of the metallic members 37 are positioned in the vicinity of respective ones the 22 frets 37, the metallic members being so positioned that individual ones of the members extend substantially parllel to the strings (not shown in FIG. 1B), which extend along the neck 30 of the guitar 10. This arrangement provides, in effect an array of switch means the respective switch means, which includes respective ones of the metallic members 37 and individual ones of the strings 36 (FIG. 1A). The respective switch means produce an output whenever an individual ones of the switch means are closed, a condition which exists whenever the instructor positions his finger or fingers on a respective one of the frets 27, thus providing fret-identifying information while the particular string which is depressed against the fret provides string-identifying information. It is to be appreciated that the array of switch means may take any number of forms which may be convenient, a simplified schematic of the switch array being shown in FIG. 1C. As illustrated in FIG. 1C, the six metallic strings 36 are shown as respectively connected to a point of circuit reference potential via respective resistors 38-43. The fret components of the switch means are illustrated by respective ones of single poles 44 which when closed place a scanning d.c. voltage on its associated string 36 causing current to flow in one or another of the resistors 38-43 and a voltage drop to appear on one of 22 terminals 45-66. The appearance of the voltage drop identifies which of the 22 frets is involved. At the same time, the voltage on a respective one of six terminals 67-72, which are conductively connected to respective ones of the strings 36, increases above ground level (which is present when no current flows in the resistors 38-43); thus, the particular string of the six strings 36 which is being held against a particular one of the frets at any given time can be identified. The individual switch means may be of the capacitive, mechanical or electromagnetic type, instead of the metal contact type shown in FIGS. 1B and 1C.

Returning to FIGS. 1A and 1B, it can be readily seen that the array of switching elements, shown in FIG. 1C in simplfied form as a schematic, produce a voltage conditions which indicate which string, if any, is being depressed against which fret at any given time, such signals can be considered to be ONE's and ZERO's indicating respectively a closed or an open condition of the individual switch means constituting the array. These signals constitute fret-identifying and string-identifying information which are fed via a cable 73 to signal processing circuit designated generally by the numeral 74 in FIG. 1A. The processing circuitry, which is shown in more detail in FIG. 2 provides an output which is fed, via a cable 75 to the left channel of the cassette recorder 26 so that the signals representing the condition of the array of switching means may be recorded on a second track of a recording medium running in the cassette 26.

It is advantageous to mount the metallic conductors 37 (FIG. 1B) on a structure which may be removably attached to the neck of a conventional stringed instrument. Such an arrangement is shown in FIG. 1D which shows a flexible, thin board or sheet 30' provided with curved sides 30a and 30b for fixing the board to the neck of a stringed instrument. Other connecting techniques could be used, for example, hook-and-loop fasteners could be used. A plurality of 22 narrow rectangular apertures 27' are provided along the length of the board 30' and are so positioned that when the flexible board is snaped over the neck of a conventional stringed instrument, such as a guitar, its respective frets will extend through the respective apertures 27'. A plurality of metallic number 37', which correspond in function to the metallic members 37 (FIG. 1B) are fixed to the surface the flexible board. The members 37' are gathered and are connected to the processing circuitry and cooperate with the metallic strings in the same fashion discussed above with respect to FIGS. 1A and 1B.

As shown in FIG. 2 the signal processing circuitry indicated generally by the numeral 74 in FIG. 1A is shown in somewhat more detail, the cassette 26 being shown as well with the array of switch means being illustrated as a block 76. The circuit of FIG. 2 includes microprocessing means, illustrated as a microprocessor 77 with an associated random-access-memory (RAM) 78 a read-only-memory (ROM) 79 and an address latch 80. The microprocessor 77, the RAM 78, the ROM 79 and the address latch 80 are innerconnected and associated with a demultiplexer means, illustrated as a demultiplexer 81 and a demultiplexer 82 which, on the control of the microprocessor 77 effect a scanning of the switching array 76 so as to produce fret-identifying and string-identifying information, which after processing, are fed to a universal asynchronous receiver instruction/transmitter (UART) 83. The UART 83 has its transmitter output coupled to the left channel of the cassette 26, via a digital-to-analogue converter 84. Thus, the information as to the switch conditions in the array 76 can be continuously scanned repetitively and the data, in analogue form, is recorded one of the tracks in the recording medium in the cassette 26. At the same time, the audio signals provided by the instructor and from the audio output of the instructional guitar, which are mixed in the mixer 13 (FIG. 1) can be simultaneously recorded on another track of the recording medium in the cassette 26 via the right input channel thereof, a diagrammatic microphone 85 being shown as a general indication of this possible audio input.

Figure 5:
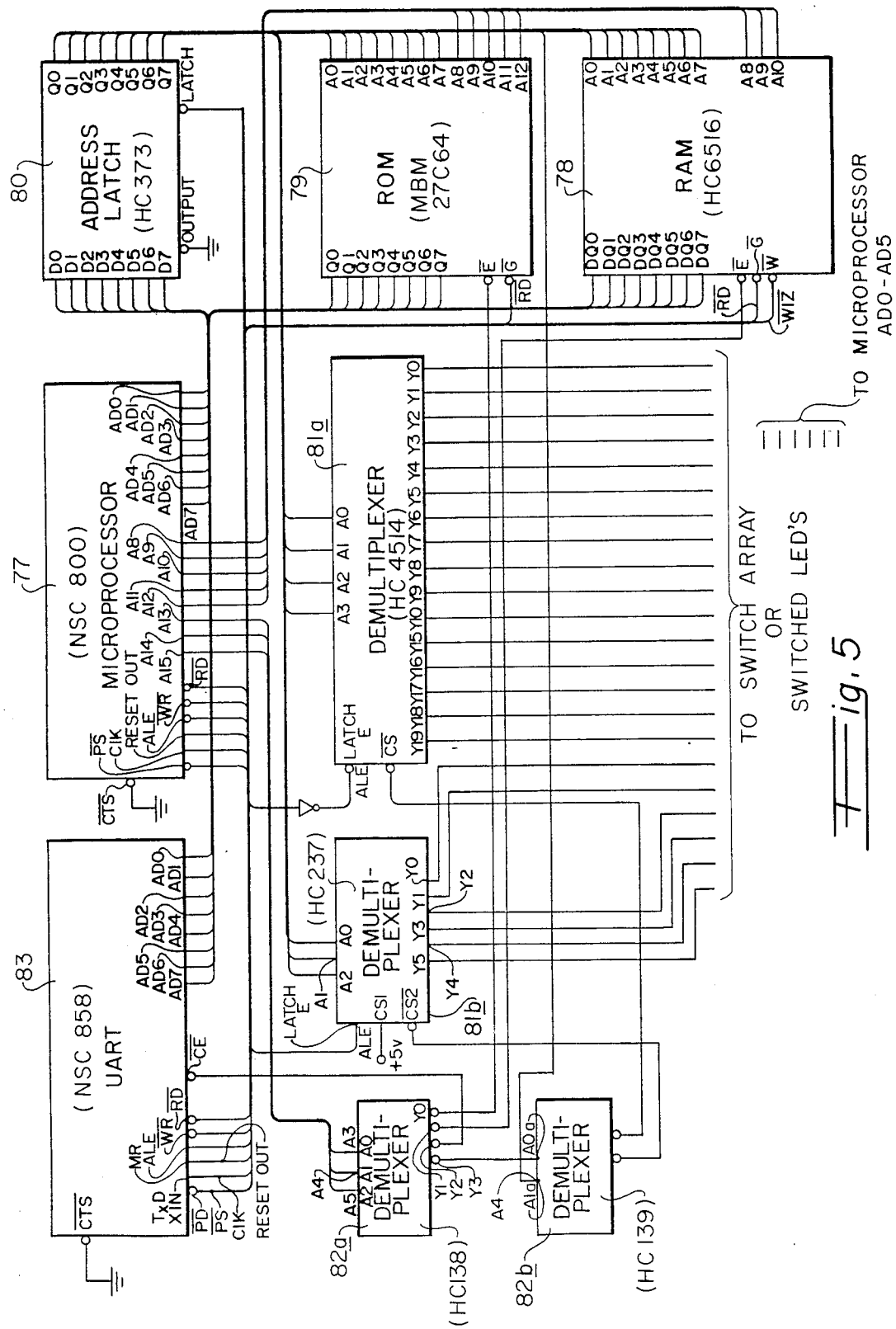
FIG. 5 is a detailed block wiring diagram of the system illustrated in FIGS. 2 and 4 useful in constructing a working embodiment suitable for use in both the input and playback modes.

The wiring details of the circuit illustrated in FIG. 2 is shown in FIG. 5, the demultiplexer 81 (FIG. 2) being shown in its realized form as being constituted by two demultiplexers 81a and 81b, the demultiplexer 82 (FIG. 2) being realized as demultiplexers 82a and 82b. The circuit components illustrated in block form in FIG. 5 may be constituted by respectively commercially available circuit components under the letter-numeral designations shown in (FIG. 5). It is to be appreciated of course that other equivalent components could be used as well without departing from the present invention.

The embodiment of the present invention illustrated in FIGS. 3A and 3B shows the system for facilitating the instructional musicians arranged in the playback configuration a student musician 86 is shown holding an instructional guitar 87 during a learning session. The instructional guitar 87 includes conventional pickups having six conventional pickup pole pieces associated with the respective ones of the six strings of the guitar, the pole pieces 88–93 being shown in FIG. 3B. The neck 94 of the instructional guitar, as illustrated in FIG. 3B, has had the strings 95 (FIG. 1A) removed for the purpose of clarity. The neck 94 of the guitar 87 includes 22 conventional raised frets 105, the uppermost fret being provided with the reference numeral. The guitar 87 includes a conventional nut 96, with six conventional guide grooves 97 therein, as well as six conventional turning keys 98 and six conventional posts 99. The neck 94 of the instructional guitar 87 shown in FIG. 3B includes an array of light-emitting elements 100, one of these being provided with reference numeral. The light-emitting elements can be desirably be conventional LED's and are distributed along the neck 94 of the guitar so that in the vicinity of each of the frets 105 a respective row of six spaced apart light-emitting elements 100 are arranged in a respective one of 22 lines of such elements. The individual elements 100 in each of the rows are spaced apart so as to be positioned beneath or in the immediate vicinity of respective ones of the six strings (not shown in FIG. 3B). As shown in FIG. 3A, the instructional guitar 87 is provided with a conventional audio output which is fed to a preamplifier within a loudspeaker enclosure 101, via a cable 102. The student musician 86, when playing the instructional guitar 87, can hear musical results of his playing via the loudspeaker 101. A cassette recorder 102 is also provided and has one of its channels, for example the right channel thereof, coupled to a second input of the amplifier section of the loudspeaker 101 via a cable 103. Thus, when the student 87 wishes to play his instructional instrument in accordance with instructions and/or an exemplary musical composition recorded on one of the tracks of the recording medium being played back by the cassette 102, he need only turn the cassette 101 on and hear the music and/or voice audio which had previously been recorded by the instructional musician on the medium being played back in the cassette recorder 101, the instructions and muscial compositions having been previously recorded by an instructor, as shown in FIGS. 1A and 1B. The first track of the recording medium being played back within the cassette 101, which may be the left channel thereof, is supplied via a cable 104 to the receiving input of the signal processing circuitry indicated generally by the reference numeral 106. The circuit within the processing circuitry 106 provides control signals, via a cable 107, for energizing respective ones of the light-emitting elements 100 arranged on the neck 94 of the instructional guitar 87. The particular light-emitting element or elements which are energized at any given time corresponding to the fret 105 and string 95 which the student is to play in order to emulate the playing or instructions of the instructor.

In FIG. 4 the circuitry indicated generally by the numeral 106 in FIG. 3A is shown in some detail, in association with the cassette recorder 102 and a switched LED array 107, which are shown in FIG. 4 as respective blocks. The circuitry includes an analogue-to-digital converter 108 which receives as its input the ouput from the left channel of the cassette recorder 102, its digital output being supplied to the receiver input terminal (Rx) of a universal asynchronous receiver/- transmitter 109 which has its data output channel connected to a microprocessor means which includes a microprocessor 110 with its associated random-access-memory (RAM) 111, a read-only-memory (ROM) 112 and an address latch 113. The microprocessor 110, the RAM 112, the ROM 111 and the address latch 113 being connected together as shown in FIG. 4 and connected as well to a first demultiplexers 114 and a second demultiplexer 115. The demultiplexer 114, 115 are coupled to the switched LED array 107 so as to scan the array under control of the demultiplexers 114, 115 and, with the microprocessor 110, effect a programmed energization of the individual LED's in switched array 107. The processing circuitry illustrated in FIG. 4 can be constructed as shown from the same commercially available components illustrated in FIG. 5, the only difference being that the UART 109 is arranged to receive rather than to transmit data and that switched LED's are substituted for the switch array.

Figure 3C:
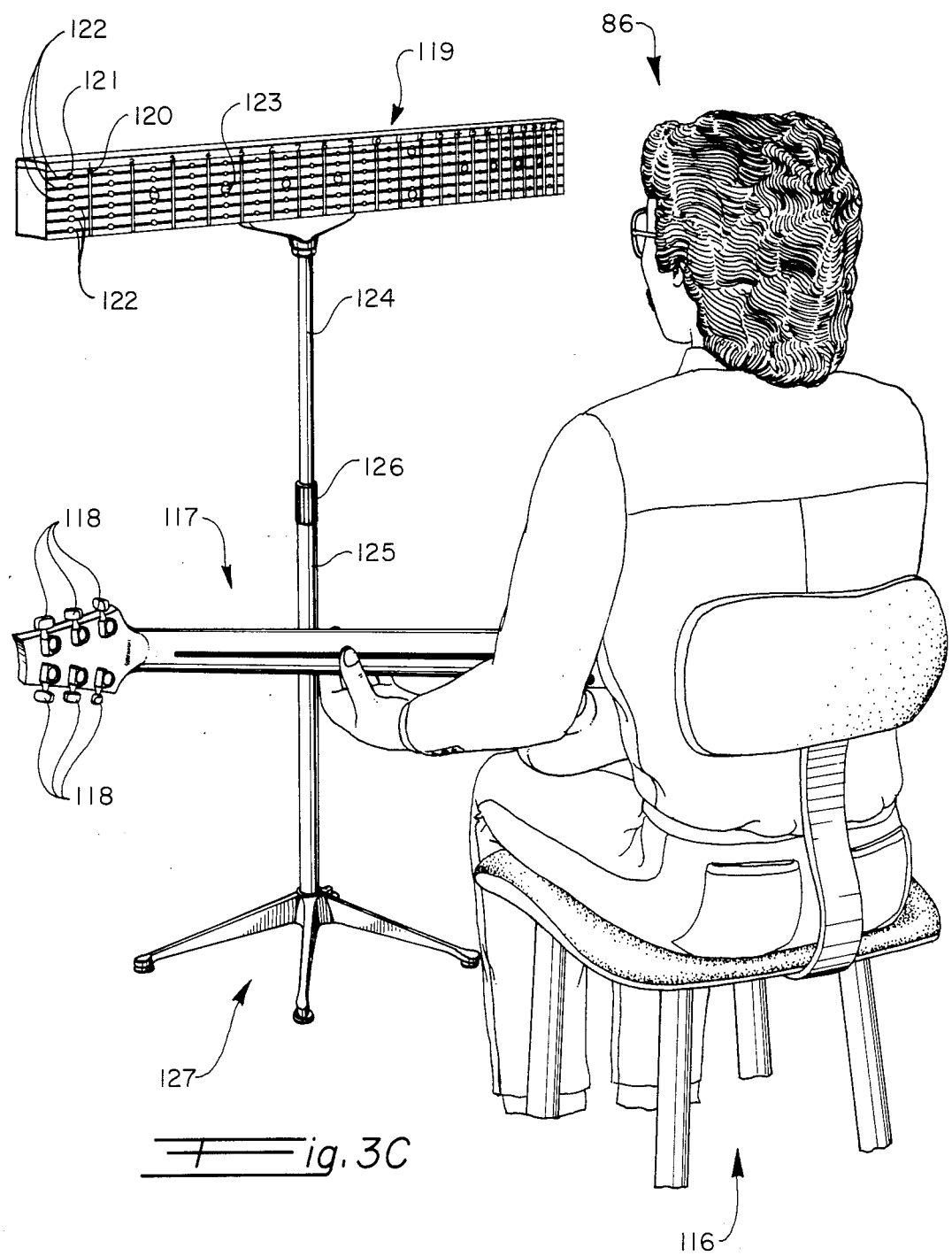
FIG. 3C is a pictorial representation of the neck of a mirror image of the neck portion of a guitar which when used with a conventional guitar can replace the instructional guitar shown in FIG. 3B, a student being shown holding the conventional guitar.
Figure 3D:
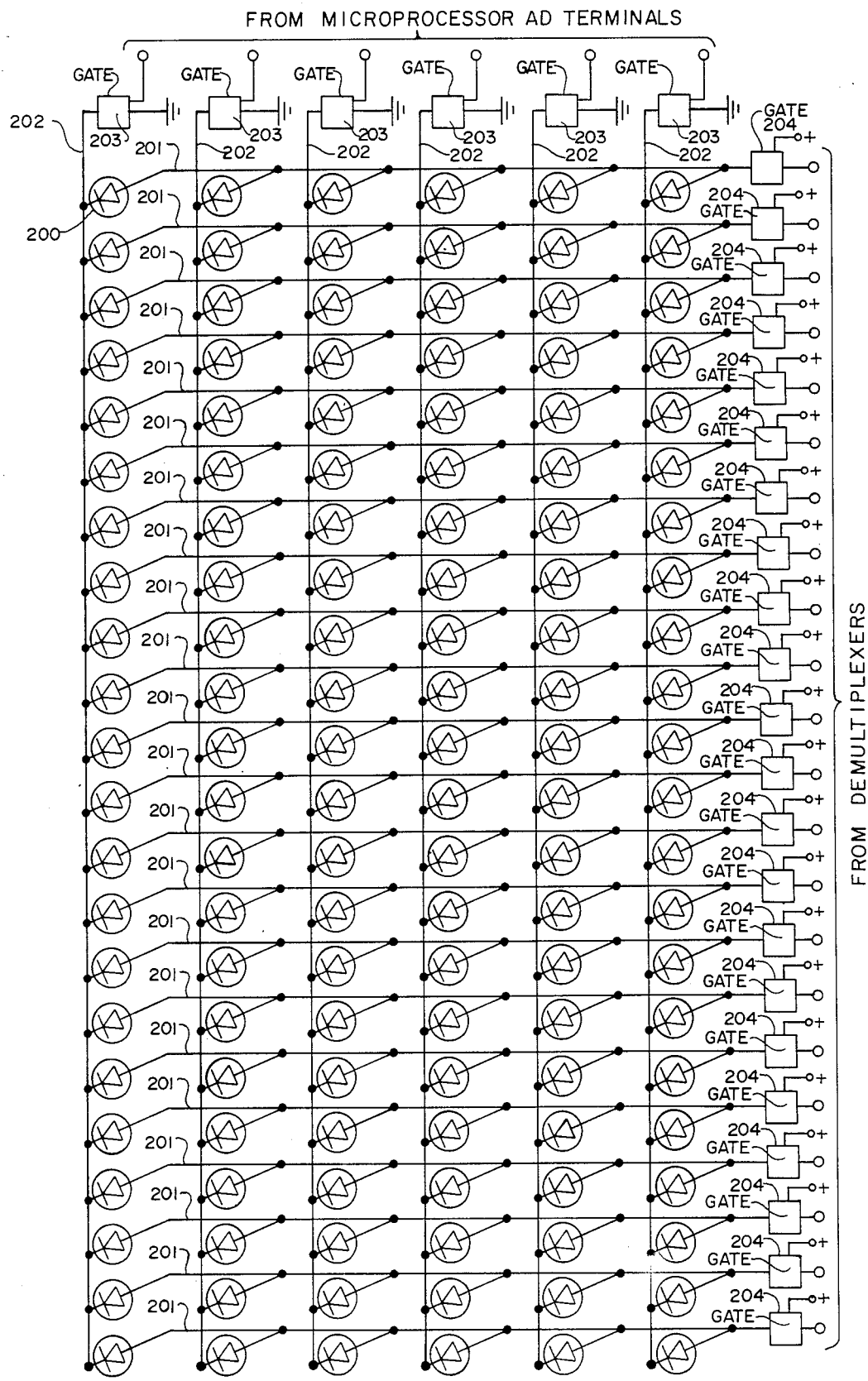
FIG. 3D is a schematic diagram of the array of LED's shown in FIGS. 3B and 3C and the circuit connections thereto.

The switched array of LED's with associated gates is shown in FIG. 3D.

The exemplary embodiment of the switched array of LED's 107 (FIG. 4) is shown in FIG. 3D as including 132 LED's 200, one being provided with the reference numeral. The anode of each respective LED 200 of groups of six (one for each string) is connected to a respective bus 201 of one or another of 22 buses (one for each fret). The cathode of each LED 200 of groups of 22 are connected to a respective one of six buses 202 (one for each string). The respective buses 202 representing the respective strings are connected to reference ground via respective gates 203 which have their respective control input terminals to control outputs provided from the microprocessor (110, FIG. 4; 77, FIG. 5). The respective buses 210 representing the respective frets are connected to a point of positive potential via respective gates 204 which have their respective control input terminals to the demultiplexers (81a, 18b, FIG. 5). In operation, the LED's 200 are selectively energized, the demultiplexers 81a, 18b providing addressing control inputs to the control terminals of the gates 204 in sequence to the scan buses 201, while the microprocessor effects an addressing of the buses 202 in sequence. Whenever, both the positive and ground potentials appear across any of the LED's 200, it becomes illuminated thereby providing an instructional visual signal to a student as to which fret and which string he is to manipulate.

A particular advantageous arrangement which may be considered to constitute a variant of the system of the present invention in its played back configuration is shown generally in FIG. 3C in which the student musician 86 is shown sitting in a chair 116. Unlike the instructional guitar 87 (FIG. 3A) the student musician 87 has a conventional guitar 117 in his hands, the neck of the guitar 117 and the conventional six tuning keys 118 being visible. In order to avoid the need for looking down or holding the instructional guitar 87 (FIG. 3) in an awkward position, a support 119 having thereon respective representations 120 (the left-most one being provided with the reference numeral) of the 22 frets of a conventional guitar are provided on the front-facing surface. The support can be considered a mirror image provided for viewing by the student musician 86. The support 119 carries thereon an array of light-emitting devices (LED's) 121 arranged in vertical columns and rows, six LED's being provided in each vertical column in the vicinity of the respective representation 120 of the 22 frets. A plurality of six lines 122, visible to the student musician 86 extend substantially horizontally along the front face of the support 119, these lines corresponding to and representing the six strings of the guitar which the student musician 86 has in his hands. Representation of conventional position marks 120 (one being provided with the reference numeral 120) are also provided on the front face of the guitar, these representations corresponding to actual position marks which exist on the conventional stringed instruments such as guitars. The support 119 with the array of LED's 121 is supported on a cylindrical member 124 which extends into a tubular member 125 in telescoping engagement therewith, a conventional threaded tightening nut 126 being provided to allow the student musician to adjust the height of the support 119 with respect to his eye level. The tubular member 125 is fixed in a conventional four-legged floor engaging support 127.

Figure 6:
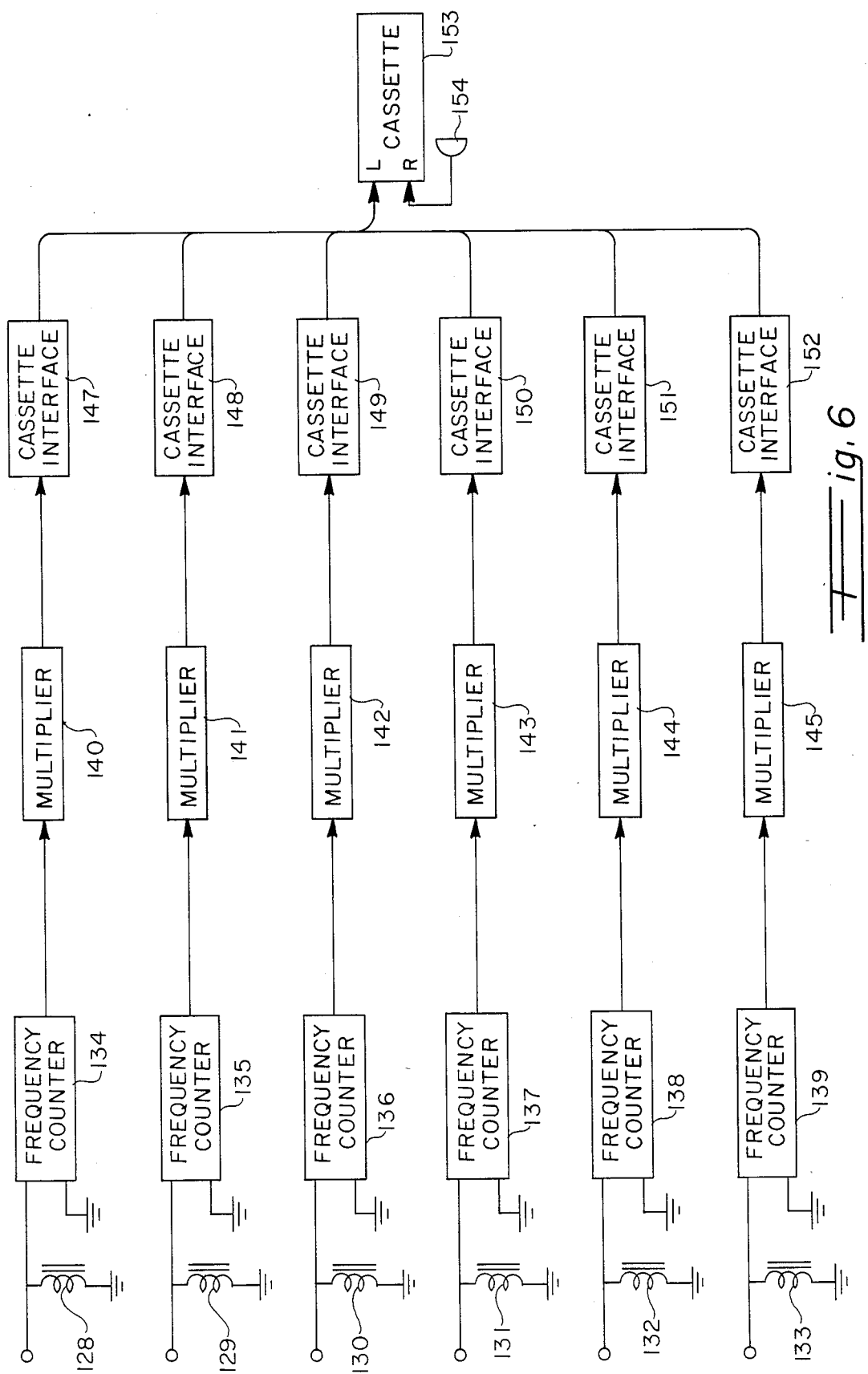
FIG. 6 is a simplified schematic diagram of a second embodiment of a circuit for processing signals from an instructional guitar and a microphone input in accordance with the present invention.

It is to be appreciated that the system for facilitating instructional musciains may take several forms, a second exemplary embodiment of such a system for processing signals in its input configurations being illustrated generally in FIG. 6. In this instance, the fret-identifying and string-identifying inputs are provided from the conventional respective pickup heads which are associated with the respective six strings of the stringed instrument. As shown in FIG. 6 the respective pickup heads are illustrated as six respective iron cored coils which are connected to supply an input to six respective frequency counters 128-133 which provide a respective outputs corresponding to the musical notes produced by the six strings associated with the respective six pickup coils. The respective outputs from the coils 128-133 are coupled to frequency counters 134-139, the outputs of which are respectfully coupled to six respective multipliers 140-145 which multiply the respective outputs from the frequency counters 134-139 by different whole number values so that respective digital signals produced represent different frequency bands; thus, the system may distinguish the particular string which has been struck. This is particularly useful because the same musical note may be produced by one or another of more than one of the six strings of the guitar. The respective outputs from the multipliers 140-146 are fed to respective cassette interface circuits 147-152, which advantageously are digital-to-analogue converters, the output analogue signals therefrom fed to the left input channel of a cassette recorder 153. The right channel of the cassette recorder 153 receives audio speech and/or music signals provided by the instructor and his guitar during an input session, the audio input being illustrated diagrammatically as a microphone 154.

Figure 7:
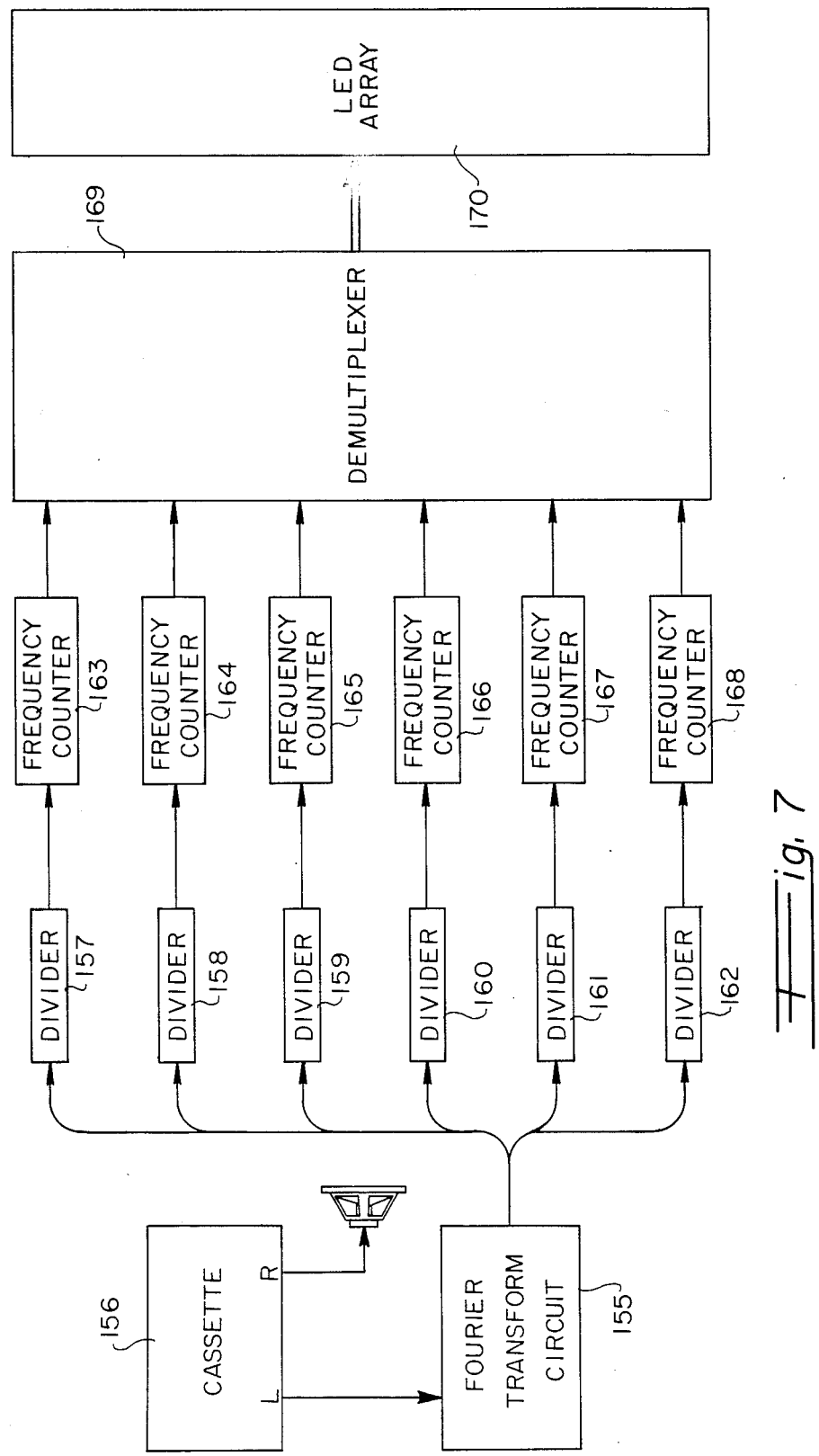
FIG. 7 is a simplified schematic diagram of a second embodiment of a circuit for processing signals from recorded instructions in accordance with the present invention, which is particularly useful in association with the recordings made using the circuit of FIG. 6.

Turning to FIG. 7, the second embodiment of the circuit for processing signals from recorded instructions in accordance with the present invention includes a Fourier transform circuit 155 which receives the analogue output from the left channel of a cassette recorder 156 operating in its playback mode. The output from the Fourier transform circuit is supplied to six dividers 157-162 which in turn have their outputs coupled respectively to respective ones of six frequency counters 163-168 which, in effect, identify the particular string and fret which is to be depressed by the student musician for each and every recorded note translating this information into control signals which are supplied to a demultiplexer 169. The outputs from the demultiplexer 169 are supplied to an LED array 170 and effects the selective energization of individual ones of light-emitting elements (LED's) in the LED array. The LED array 170 is positioned either on the support 119 (FIG. 3C) or embedded in the neck of an instructional guitar 87 (FIG. 3B).

It is to be appreciated that the aforegoing description of preferred embodiments of the system of the present invention as well as various subcombinations thereof, have been set out by way of example not by way of limitation. Numerous other embodiments and variance are possible without departing from the spirit and scope of the present invention, its scope being defined in the appended claims.

What is claimed is:

1. In a system for facilitating instruction of musicians in playing of a stringed instrument of the type having a plurality of pickup heads, strings and frets such as a guitar, the system including a recorder, an improvement comprising a plurality of frequency counters, individual ones of said frequency counters being coupled to respective ones of said pickup heads and responsive to signals therefrom resulting from playing of the instrument for developing signals corresponding to musical notes being played respectively on each string, respective multipliers coupled to respective ones of said counters and responsive to output therefrom for developing signals in separated respective bands whereby respective ones of the strings can be identified, and interface means coupled to said multipliers and responsive to output therefrom for supplying input to said recorder.

2. The system according to claim 1, wherein said interface means comprises digital-to-analogue converter means.

3. The system according to claim 1, wherein said recorder is a cassette recorder.

4. The system according to claim 3, wherein said cassette recorder is a dual channel recorder, the analogue signals from the digital-to-analogue converter means being fed to the cassette recorder being recorded on one channel thereof.

5. The system according to claim 4, including means for supplying an instructional audio voice and/or music signals to said cassette recorder for recording on the other channel thereof.

6. In a system for facilitating instruction of musicians in the playing of a musical instrument, the system having a recorder for storing signals representing musical notes to be played and time values thereof and display means for providing a visual indication of the musical notes to be played, an improvement comprising a Fourier transform circuit coupled to said recorder and responsive output therefrom for developing signals representative of the musical notes to be played, a plurality of dividers coupled to said Fourier transform circuit and responsive to output therefrom for separating the output into respective bands, a plurality of frequency counters individually coupled to respective ones of said dividers and responsive to output therefrom for developing fret and string indentifying signals and demultiplexing means coupled to said frequency counters and responsive to the signals therefrom for controlling energization of the display means.

7. The system according to claim 6, wherein said display means comprises an array of light-emitting members, one respective light emitting member being provided for each note.

8. The system according to claim 6, wherein said recorder includes a multitrack recording medium, the signals representing musical notes to be played and the time values thereof being recorded on one track of the recording medium and voice and/or music signals being reproducible from another track of the recording medium.

9. An input device for use in conjunction with an input stringed instrument of the type having a plurality of strings and a plurality of frets, the device comprising an array of switch means and a sheet, said array of switch means being carried in or on said sheet, wherein said sheet has a plurality of apertures therein through which the frets may extend, said switch means being so distributed that individual ones of said switch means will be positioned beneath each of the strings in vicinity of each of the frets whenever the sheet is positioned on the instrument.

* * * * *